United States Patent [19]

Lemonnier et al.

[11] Patent Number: 4,629,897

[45] Date of Patent: Dec. 16, 1986

[54] AUTOMATIC HIGH INSULATION SWITCH

[75] Inventors: Marc Lemonnier, Les Ulis; Denis Petermann, Paris; Daniel Le Fur, Les Ulis; Stephan Metgert, Villebon-Sur-Yvette, all of France

[73] Assignee: Centre National de la Recherche Scientifique, Paris, France

[21] Appl. No.: 470,448

[22] Filed: Feb. 28, 1983

[30] Foreign Application Priority Data

Mar. 1, 1982 [FR] France ............................... 82 03344

[51] Int. Cl.$^4$ ............................................ G01T 1/00

[52] U.S. Cl. .................................... 250/385; 250/388; 333/140

[58] Field of Search .................... 324/115; 250/385 R, 250/203 R, 385 SC, 388, 374; 33/138, 139, 140, 172, 1 M; 338/13, 17; 178/19

[56] References Cited

U.S. PATENT DOCUMENTS 3,772,521 11/1973 Perez-Mendez .................... 250/385

3,800,146 3/1974 Brunkhorst et al. ............ 250/203 R 3,891,851 6/1975 Fletcher et al. .................... 250/385

3,992,099 11/1976 Laughlin ......................... 250/203 R 4,320,299 3/1982 Bateman et al. .................... 250/385

*Primary Examiner*—Ernest F. Karlsen

*Attorney, Agent, or Firm*—Kerkam, Stowell, Kondracki, & Clarke

[57] ABSTRACT

Proportional detector intended to detect ionizing radiations for 2-dimension localization.

This detector consists of a network of conducting wires (2) forming the anodes of an ionization chamber and operating under avalanche conditions and is characterized in that it comprises a continuous resistive collector (12) with two dimensions and located between the anode (2) wires and the cathode (1) on which the localization of an electron avalanche is effected by electrostatic induction, the reading of the data concerning the electric pulse generated by induction on the collector (12) being effected at the periphery of the latter.

8 Claims, 8 Drawing Figures

FIG.7
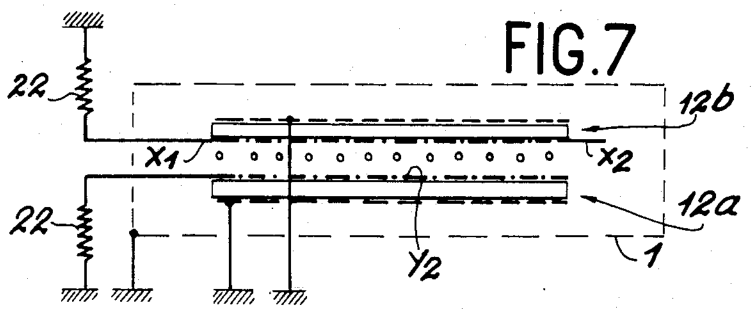
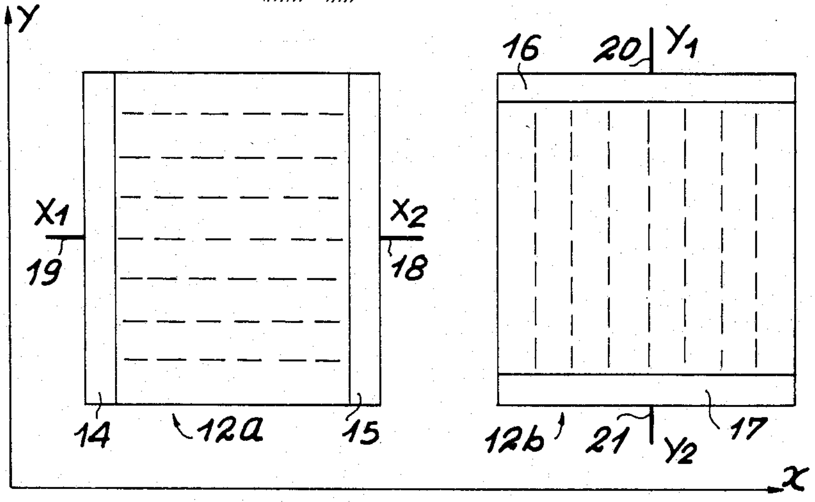
FIG.6
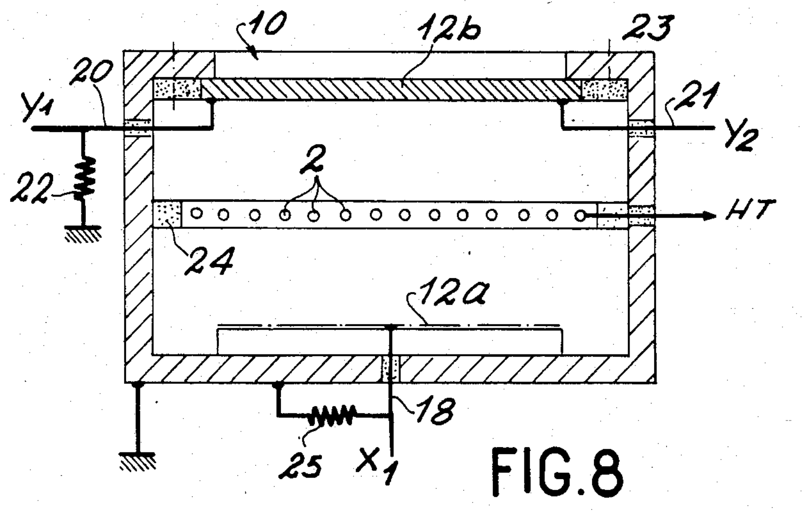
FIG.8

AUTOMATIC HIGH INSULATION SWITCH

DESCRIPTION

The invention relates to a proportional detector intended to detect ionizing radiations that is of the type known from the prior art and operates by the avalanche effect.

First, we shall call to mind, with reference to the accompanying FIGS. 1 to 3, the operating principle of the main types of these prior art detectors for ionizing radiations.

Generally speaking, it will be recalled that proportional counters—which are widely used detectors particularly in fundamental physics measurements—are ionization chambers filled with an ionizable gas in which the amplitude of the electric signal obtained during the passage of an ionizing agent is proportional to the number of ions generated by this agent in the space of the chamber or—which amounts to the same thing—to the energy lost by this agent in said space. This energy results directly from the pulse amplitude.

More often than not, this type of counter consists of a negative cylindrical chamber and a positive small-diameter coaxial wire if counters are involved that operate solely in one dimension. Let it be assumed that a single pair of ions is formed in the space of the chamber by an incident ionizing particle, with the positive ion flowing slowly to the negative cylinder while the much lighter electron travels rapidly to the area surrounding the wire where there is a very strong electric field. This thusly accelerated electron release by collision new electrons that, in turn, are accelerated and create new electrons, and so on and so forth. This is the avalanche phenomenon well known in the art. As a result, there appears on the wire a pulse which is detected on the two ends thereof, so that its position in space can be determined with a high degree of accuracy.

In the specific embodiment of the invention depicted in FIG. 1, the ionization chamber is defined by a conducting cylinder 1 and is held at a high negative potential with respect to the coaxial wire 2 connected to ground. This wire 2 is resistive and, for that purpose, usually consists of a quartz wire coated with a graphite lining. Under the effect of an incident ionizing particle 3, a pulse 4 is generated at a point on the wire 2 and is propagated from that point to both ends of the counter where the rise times $T_1$ and $T_2$ of the corresponding wave are observed. In this mode of propagation, which is that of a delay line with distributed parameters RC (where R is the unit-area resistance of the wire 2 and C the unit-area capacitance of the coaxial wire 2 in the chamber 1), these rise times $T_1$ and $T_2$ are shown to be proportional to the distance between the point of origin of the pulse 4 on the wire 2 and the corresponding terminal of this same wire 2 outside of the chamber 1, provided that the time constant RC is sufficiently high. Thus, by comparing $T_1$ and $T_2$, one can determine the exact position of the point of origin of the pulse 4, i.e. in the last analysis, of the incidence of the particle 3. This type of counter (e.g. described in French Pat. No. 1,590,045) has at least two major drawbacks: First, it easily breaks upon impact of a direct beam of ionizing radiations such as, for example, X-rays, because when the avalanches are excessive in number and intensity, the graphite lining, which renders the wires 2 resistive, deteriorates very rapidly and makes the counter unusable. Furthermore, the operation assumes that the cylinder 1 forming the chamber is held at the high voltage with respect to ground, which can be a major inconvenience for the research worker.

In another modification of the proportional counter depicted in FIG. 2, the wire constituting the anode 2 of the conductors is made out of a single, taut metal wire and it is this wire that is held at the high voltage, while the metal chamber 1 is at zero potential. In this type of counter, the appearance of a pulse 4 under the effect of an incident ionizing radiation 3 is detected by means of a number of discrete capacitive collectors 5 connected to an inductive line 6 outside of the ionization chamber 1 proper. Under these conditions, the propagation of the pulse 4 generated on the anode 2 occurs through a delay line with distributed parameters LC, which permits the reception, on the two ends of the counter, of identical pulses 7, since the delay line does not have resistive elements that would damp the signal. As a result, in this embodiment, it suffices to compare the times of arrival of the pulses 7 on the ends of the chamber 1 in order to determine the point of origin of the pulse 4 on the wire 2. This prior art counter already has a certain advantage over the counter depicted in FIG. 1 in that the processing of the signal is easier because of the fact that the pulses are calibrated. In addition, since the wire 2 is a standard metal wire, it is not as fragile as that of the counter shown in FIG. 1 and, since the case 1 is connected to ground, there are no major disadvantages for the user.

At all events, the two types of proportional counters described above lead to the same problem of employment as soon as they are no longer to be used as simple linear counters, but as counters capable of determining the impact of a particle or of an ionizing electromagnetic radiation upon a surface with two dimensions. In order to obtain this result in practice, it is necessary to use a network of parallel wires *2a, 2b, 2c*, etc. (FIG. 3), on the ends 8 and 9 of which signals are received that are processed individually according to the type of counter, as pointed out above for the two embodiments described earlier. Thus, one can appreciate the constructional problems, because if the device of FIG. 3 has n parallel wires, one must use n delay lines and n electronic data-reading devices in order to carry out a 2-dimension localization of a pulse 4 appearing at a point of the network 2.

The object of the invention is a proportional detector intended to detect ionizing radiations capable of effecting a 2-dimension localization with an efficiency comparable to the counters described above, but with an incomparably simpler implementation of the process.

This 2-dimension radiation detector of the type known from the prior art and comprising a network of parallel conducting wires forming the anodes held at a high positive voltage of an ionization chamber with a gaseous atmosphere contained in a conductive case forming the cathode and operating under avalanche conditions is characterized in that it consists of a continuous resistive collector with two dimensions and is located between the anode wires and the cathode on which the localization of an electron avalanche produced in the vicinity of an anode wire is effected by electrostatic induction, the reading of the data concerning the rise time of the electric pulse thus generated by induction on the collector being effected at the periphery of the latter on at least two points located on the axes of symmetry of the network of anode wires.

Put differently, the proportional detector embodying the invention combines the advantages of the prior art counters described with reference to FIGS. 1 and 2 in that it uses a resistive collector and an RC delay line and the principle of transmitting the information to the collector by electrostatic induction, which enables the continuous use of such a collector with two dimensions, and the processing of the results with the aid of at least two electronic reading systems that read the data at the periphery of the collector according to the axes of symmetry of the network of anode wires. In addition, the detector incorporating the invention preserves the advantage that it has the high voltage on the anode and that the cathode is connected to ground as in the prior art detectors depicted in FIG. 2. It borrows from these same detectors the use of anode conducting wires of metal without the fragile-making graphite lining, since the resistance of the delay line used for the pulsing is that of the surface of the collector.

According to a very important and interesting feature of the invention, the RC time constant of the delay line is increased by the addition of a capacitance which is optionally adjustable and is connected in series between the resistive collector and the mass of the cathode. As has been shown with regard to the proportional counters of known construction described in FIG. 1, the rise time of the pulses is a function of the RC time constant of the delay line constituting the system and it is desirable that this time constant exceed at least a given threshold so as to facilitate the reading of the pulses. The existence of this adjustable capacitance (by its surface or by the distance between the cathode and the supplementary electrode) enables one to obtain the highest value for the RC constant desired.

According to a secondary, but important, feature of the detector embodying the invention, the resistive collector can be divided into two separate identical, but superimposed, collectors after swivelling 90° in space, each of which has on two opposed sides conduction bands for the samping of the electric data, the first collector carrying said bands with its sides turned in the direction of the y-coordinate being used to read the data on the x-coordinate, and the second collector carrying said bands with its sides turned in the direction of the x-coordinate being used to read the data on the y-coordinate.

According to an interesting modification of this feature, at least one of the resistive collectors described abaove is formed by the entrance window of the counter that has been rendered resistive for that purpose. In some cases, provision can be made so that the two collectors each correspond to one of the two entrance windows of the detector that face one another along two parallel faces of the case forming the cathode.

The main advantage of this splitting of the resistive collector into two collectors lies in the complete elimination of the edge effect and of the electric reading distortions X and Y that are inevitable when said data are sampled at points located in the middle of each of the edges of a single collector. In fact, in the case of two separate collectors, each of which is specialized in the reading of the x- or y-coordinate of the point of appearance of a charge by induction, the side conduction bands employed ensure a flow of said charge in the direction of current lines that are always perpendicular to the common direction of the two parallel bands of the square or rectangular pickup plates employed. Thus, an independent reading is obtained of each coordinate of the point of appearance of a charge by induction.

The counter embodying the invention can have a flat, curved, or especially cylindrical, symmetry. To this end, it suffices that the network of anode wires define in space a ruled surface of the same nature as that of the cathode, on the one hand, and of the resistive screen on the other, with the respective distances between these different elements remaining constant. The resistive collector can be produced according to any known process and, in particular, by a carbon or tungsten lining on a plastic sheet. Since, in order to obtain by this process a resistive collector with a sufficiently high resistance so as to obtain a given RC time constant is sometimes difficult, one can readily appreciate the importance of the adjustable supplementary capacitance that enables the distributed capacitance C of the delay line to be increased in order to adjust the time constant to the desired value.

BRIEF DESCRIPTION OF THE DRAWINGS

FIG. 6 shows separately the two independent collectors in the event the resistive collectors are split into two;

FIG. 7 shows an embodiment of the detector of the invention equipped with a split resistive collector mounted in the device case;

FIG. 8 is a cross-sectional view of an embodiment of a detector with two separate collectors in the case where one of them consists of the entrance window of the device case.

FIG. 4 shows a case 1 forming the cathode and equipped with a window 10, the cathode 1 being connected to ground. The window 10 shall at the same time be conductive (to ensure the continuity of the electric field in the detector) and pervious to the ionizing radiations that are to be detected. For example, it can be made of beryllium or aluminum of modest thickness (100 $\mu$m) in electrical contact with the case 1. Within the cathode 1 there is installed a set of parallel conducting wires 2 that form a kind of network or lattice, each of the wires 2 being connected in parallel by the line 11 to the positive terminal of a high-voltage source. The network of conducting wires 2 thus constitutes the anode of the proportional counter. According to the invention, there is inserted between the network of wires 2 and the cathode 1 the resistive collector 12 whose surface is conductive, continuous and isotropic in terms of its electric resistivity. The collector 12 is connected to ground by a biasing resistor (22) which puts it at zero potential in the absence of a signal. The distributed capacitance of the thusly formed RC delay line is increased in the desired proportions and can be adjusted through the conductive electrode 13—itself connected to ground—located between the resistive collector 12 and the cathode 1.

The electrical specifications corresponding to the influences received from the network of wires 2 by the resistive collector 21 are transmitted and analyzed at four points $X_1$, $X_2$ and $Y_1$, $Y_2$ located along the axes of symmetry of the network of anode wires 2. Experience has shown that the reading of these data is still possible if one is satisfied with only two electrodes X and Y located in the middle of the two sides adjacent to the resistive collector 12, and a systematic correction that can be calculated with a computer is then necessary in order to restore the symmetry of the reading system. Put differently, this symmetry is possible with the aid of at least two voltage samplings at the periphery of the collector as soon as these samplings are made at two points located on the axes of symmetry of the network of anode wires. Needless to say that the reading is more correct, i.e. tainted with a much smaller systematic error, if it is effected by means of four, instead of four, voltage samplings, as shown in FIG. 4.

Figure 1:
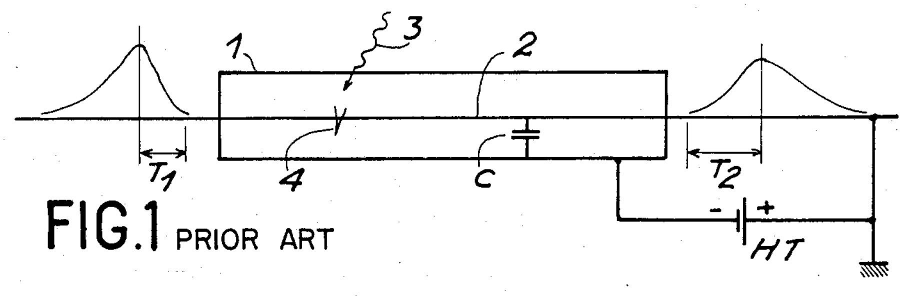
FIG.1 PRIOR ART
FIG. 1 is a diagrammatic view of a prior art single wire ionization chamber.
Figure 2:
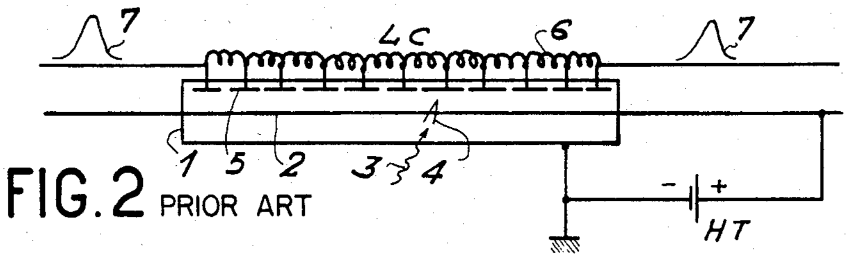
FIG.2 PRIOR ART
FIG. 2 is a diagrammatic view of a prior art proportional counter having a number of capacitive collectors.
Figure 3:
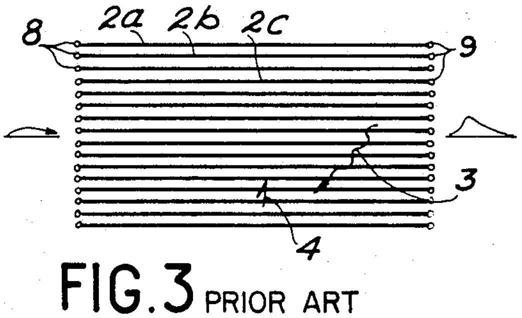
FIG.3 PRIOR ART
FIG. 3 illustrates a prior art counter having a network of parallel wire collectors.
Figure 4:
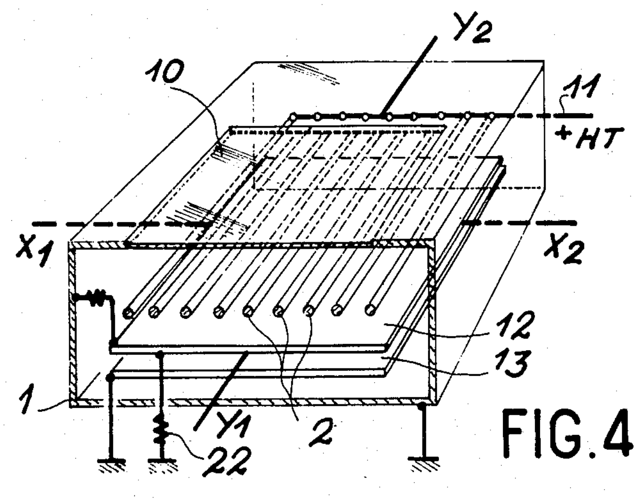
FIG. 4 is a perspective schematic exploded view in isometric projection of a proportional detector of the invention.

Since, from the electrical point of view, the counter of FIG. 4 belongs to the type of counters described in FIG. 1 that use an RC time constant delay line, the processing of the electric results read at pints $X_1$, $X_2$ and $Y_1$, $Y_2$ takes place according to the same procedures as those described with regard to the counter depicted in FIG. 1. Therefore, the processing of the electrical data received in this manner at X and Y only requires a double analyzing chain of the one-dimension system. For the operation according to the diagram of FIG. 4, a resolution is obtained in the direction Y parallel to the wires 2, which is on the order of 0.2 mm for a linear detector of 100 mm. The resolution in the direction X perpendicular to the anode wires 2 depends on the pitch of these wires which, in the embodiment prepared in the laboratory, was 0.6 mm. However, experience has shown that the resolution is greater than the wire pitch, because a pulse located between two adjacent wires is nevertheless taken into account by the detector which, on principle, reacts to the "center of electric gravity" of the charges present on the two consecutive wires.

It was possible to ascertain on this prototype that the detection cell retained its proportional character up to an activity of 400,000 strokes per second for a surface illuminated by the window 10 of 100 $cm^2$.

As in the case of all of the detectors employed, the sensitivity of the cell to different radiations (X, $\gamma$, etc.) is associated with the nature of the gas used, with its operating pressure in the enclosure 1 forming the cathode, and with the thickness of the gas passed through by the radiation or by the incident ionizing particle. The fields of application of such a proportional radiation detector are those of the 2-dimension detectors such as, for example, obtaining images from X-rays in the laboratory, diffusion, diffraction of X-rays. In the medical field, one can envisage the detection of surfaces of this type used to obtain X-ray photographs with very weak doses of irradiation of the patient, as well as 2-dimension chromatographies from radioactive molecules. Finally, different materials can be tested by transmission using detectors taught by the invention illuminated by a flux of X-rays.

Figure 5:
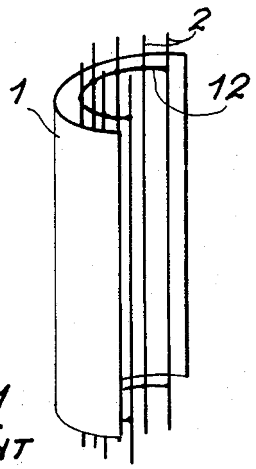
FIG. 5 shows various elements of a detector incorporating the invention in cylindrosymmetry.

Now, referring to FIG. 5, a very schematic example of an embodiment of the proportional detector of the invention will be given in which the symmetry of the anode wires 2, of the resistive collector 12, and of the cathode 1 is cylindrical. The operation of such an assembly is identical to that of the detector of FIG. 4, as soon as the surfaces of the three elements forming the network of wires, the resistive collector, and the cathode are "parallel" and spaced a constant distance from one another. Likewise, depending on the requirements in each case, other geometric configurations can be contemplated for the design of the 2-dimension proportional detectors incorporating the invention.

FIG. 6 shows schematically, in side-by-side relation, the two resistive collectors 12*a* and 12*b* which, as taught by the invention, result from the division of the collector 12 into two collectors shown in FIG. 4.

Each of the resistive collectors 12*a* and 12*b* in square or in rectangular shape is provided n two of its opposed sides, with conductive bands, i.e. 14 and 15, parallel to the OY-axis of the system of axes XOY for the collector 12*a* and 16 and 17 parallel to the OX-axis of the system of axes XOY for the collector 12*b*. In reality, as exemplified in FIGS. 7 and 8, the two resistive collectors 12*a* and 12*b* are superimposed in space with the rotation shown in FIG. 6, i.e. the two collectors 12*a* and 12*b*, which are identical, are in fact superimposed in space after swivelling 90° about their center.

The first collector 12*a* is connected to two electrodes 18 and 19 mounted on the conduction bands 14 and 15 to enable the data $X_1$ and $X_2$ to be received on the abscissa of the point where an electric pulse from the detector generates a charge Q by induction. The second collector 12*b* is connected to the two electrodes 20 and 21 mounted on the conduction bands 16 and 17 to enable the data $X_1$ and $Y_2$ to be received on the ordinate of the point where the same charge Q appears.

The division of the collector 12 into two collectors 12*a* and 12*b* provided on their edges with the conduction bands 14, 15, 16 and 17, enables a uniform electric field to be obtained on each of them and ensures current lines (denoted by the dotted line in FIG. 6) parallel to the axis OX and OY each time a charge Q is deposited by induction on any point of said collectors. The important result—which is a major advantage—is a complete elimination of the edge effect and of the inevitable reading distortions when, since there is only one collector 12, the electric data $X_1$, $X_2$ and $Y_1$, $Y_2$ relating to the arrival of the pulse edge corresponding to the appearance at point Q (X, Y) of a charge by induction, are sampled from the centers of the sides of the collector.

In FIG. 7, the same elements reappear in FIG. 4, except that the resistive collector 12 is divided into two separate, superimposed collectors 12*a* and 12*b*, each of which, as pointed out above, is subjected to the reading of the data $X_1X_2$ or $Y_1Y_2$ relating to one of the coordinates of the point of appearance of a charge Q by induction on the collector.

FIG. 8 shows an important modification of the counter depicted in FIG. 7 in which one of the resistive collectors 12*b* has merged with the entrance window 10 of the case 1. In this modification, the two collectors 12*a* and 12*b* have their resistive surfaces in face-to-face relation turned toward the interior of the case 1. Insulating frames hold, on one side, the collector 12*b* in place and, on the other side, the plane of the anode wires 2. The outputs 20 and 21 of the collector 12*b* deliver data $Y_1$ and $Y_2$ to the y-ordinate of the charge Q generated on the collector, and the terminal 18 of the collector 12*a*, which can only be seen in FIG. 8, delivers the data $X_1$. Biasing resistors 22 and 25 are provided between ground and the terminals $X_1$ and $Y_2$ so that, in the absence of pulses in the detector, the collectors 12*a* and 12*b* are at zero voltage.

In the embodiment shown in FIG. 8, the resistive collector 12*b*, which is at the same time the window 10 of the counter, can, for example, be made of graphite plastic on its inner surface and be metallized on its outer surface.

We claim:

1. A proportional detector to detect ionizing radiations for two-dimension localization comprising: anodes formed of a network of parallel conducting wires, means holding the anodes at a high positive voltage in an ionization chamber having a conductive case a gaseous atmosphere in the conductive case (1) forming the cathode and operating under avalanche conditions, a two-dimension continuous resistive collector (12) located between the anode wires (2) and the cathode (1) thus forming an RC delay line on which the localization of an electron avalanche produced in the vicinity of an anoide wire is affected by electrostatic induction, the reading of the data concerning the propagation time of the electric pulse thus generated by induction on the collector being effected at the periphery thereof on at least two points on the axes of symmetry of the network of anode wires.

2. A detector as claimed in claim 1, characterized in that the RC constant of the delay line is increased by the addition of an adjustable capacitance (13) connected in series between the resistive collector (12) and the mass of the cathode (1).

3. A detector as claimed in claims 1 or 2, characterized in that the resistive collector (12) has the form of a rectangular plate on the centers of the surfaces of which the electric data are sampled.

4. A detector as claimed in claims 1 or 2, characterized in that the symmetry of the resistive collector is cylindrical.

5. A detector as claimed in claim 1, characterized in that the resistive collector consists of a resistive lining on a sheet of plastic material.

6. A detector as claimed in claim 5, characterized in that the resistive collector consists of a lining of carbon on a sheet of plastic material.

7. A detector as claimed in claim 1, characterized in that the resistive collector is divided into two separate identical, but superimposed, collectors (12*a*, 12*b*) after swivelling 90° in space, each of which has on two opposed sides conduction bands (14, 15, 16, 17) for the sampling of the electric data, the first collector (12*a*) carrying said bands (14, 15) with its sides turned in the direction of the y-coordinate being used to read the data on the x-coordinate and the second collector (12*b*) carrying said bands (16, 17) with its sides turned in the direction of the x-coordinate being used to read the data on the y-coordinate.

8. A detector as claimed in claim 7, characterized in that at least one of the preceding resistive collectors consists of the entrance window (10) of the counter that has been rendered resistive for that purpose.

* * * * *